United States Patent
Aijaz

(10) Patent No.: US 9,591,480 B2
(45) Date of Patent: Mar. 7, 2017

(54) METHOD AND DEVICE FOR SECURE COMMUNICATION OF A COMPONENT OF A VEHICLE WITH AN EXTERNAL COMMUNICATION PARTNER VIA A WIRELESS COMMUNICATION LINK

(75) Inventor: Amer Aijaz, La Verne, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 2741 days.

(21) Appl. No.: 11/922,425

(22) PCT Filed: May 4, 2006

(86) PCT No.: PCT/EP2006/004349
§ 371 (c)(1),
(2), (4) Date: Mar. 17, 2009

(87) PCT Pub. No.: WO2006/133774
PCT Pub. Date: Dec. 21, 2006

(65) Prior Publication Data
US 2009/0212928 A1    Aug. 27, 2009

(30) Foreign Application Priority Data

Jun. 15, 2005 (DE) .................. 10 2005 028 663

(51) Int. Cl.
*B60R 25/10* (2013.01)
*H04W 12/06* (2009.01)
(Continued)

(52) U.S. Cl.
CPC .......... *H04W 12/06* (2013.01); *H04L 63/08* (2013.01); *H04L 63/102* (2013.01); *H04W 4/046* (2013.01)

(58) Field of Classification Search
USPC ......................................... 340/426.1, 425.5
See application file for complete search history.

(56) References Cited

U.S. PATENT DOCUMENTS 6,429,773 B1    8/2002  Schuyler
2003/0147534 A1    8/2003  Ablay et al.
(Continued)

FOREIGN PATENT DOCUMENTS

DE    198 53 000    6/1999
DE    103 12 946    9/2004
(Continued)

OTHER PUBLICATIONS

International Search Report, PCT International Patent Application No. PCT/EP2006/004349.
(Continued)

*Primary Examiner* — Jack K Wang
(74) *Attorney, Agent, or Firm* — Andrews Kurth Kenyon LLP

(57) ABSTRACT

A method, a device, and a communication system are provided for secure communication of at least one of multiple components of a vehicle with at least one external communication partner via a wireless communication link, the multiple components in each case including at least one communication module for data exchange. The method includes exchange of data packets between a transceiver device of the vehicle and an external transceiver station, a communication status of the wireless communication link being ascertained and a data exchange between the at least one component and/or the external communication partner on the one hand, and the others of the multiple components on the other hand and/or an access of the at least one component and/or of the external communication partner to the others of the multiple components being enabled or disabled as a function of the communication status. The device and the communication system are provided for implementing the method.

30 Claims, 5 Drawing Sheets

(51) Int. Cl.
  *H04L 29/06*    (2006.01)
  *B60Q 1/00*     (2006.01)
  *H04L 9/32*     (2006.01)
  *H04W 4/04*     (2009.01)

(56) References Cited

U.S. PATENT DOCUMENTS

| | | | | |
|---|---|---|---|---|
| 2004/0098616 A1* | 5/2004 | Jenner | ................ | H04L 63/0236 |
| | | | | 726/11 |
| 2005/0068153 A1 | 3/2005 | Lucy et al. | | |
| 2005/0162309 A1* | 7/2005 | Humphries | ........... | G01S 5/0027 |
| | | | | 342/357.31 |
| 2005/0266879 A1* | 12/2005 | Spaur | ................ | H04L 12/4625 |
| | | | | 455/556.2 |
| 2007/0266250 A1* | 11/2007 | Kampert | .............. | G07B 15/063 |
| | | | | 713/176 |

FOREIGN PATENT DOCUMENTS

| | | |
|---|---|---|
| GB | 2 402 840 | 12/2004 |
| WO | WO 01/26338 | 4/2001 |
| WO | WO 2004/004208 | 1/2004 |
| WO | 2004/066219 | 8/2004 |
| WO | WO 2004/068424 | 8/2004 |

OTHER PUBLICATIONS

International Preliminary Report on Patentability and Written Opinion, PCT International Patent Application No. PCT/EP2006/004349, dated Jan. 16, 2008 (Translated).

\* cited by examiner

METHOD AND DEVICE FOR SECURE COMMUNICATION OF A COMPONENT OF A VEHICLE WITH AN EXTERNAL COMMUNICATION PARTNER VIA A WIRELESS COMMUNICATION LINK

FIELD OF THE INVENTION

The present invention relates to a method for secure communication of at least one of multiple components of a vehicle with at least one external communication partner via a wireless communication link, the multiple components in each case including at least one communication module for data exchange, which includes exchange of data packets between a transceiver device of the vehicle and an external transceiver station, and a corresponding device and a corresponding communication system.

BACKGROUND INFORMATION

The need for data exchange between components of a vehicle and a communication partner external to the vehicle via wireless communication links is on the increase. Components of a vehicle are understood as either software applications running on a computer of the vehicle (vehicle computer) or hardware components, for example, an engine control module. In order to exchange data between vehicle components, all these components include at least one communication module which is usually designed as software and which is executable on the vehicle computer. The communication module for the engine control module is a communication interface, for example, which runs on the vehicle computer as software and makes access to the hardware parts of the component possible via a bus system.

A need for communication between the external communication partner and the components of the vehicle may have multiple reasons. For example, it may be desirable for a user of the vehicle that the engine control module exchanges data with a contract workshop of the vehicle manufacturer to make rapid and reliable troubleshooting possible in the case of a vehicle malfunction. Another example of communication via a wireless communication link is the download of multimedia information into an infotainment module of the vehicle. Many other applications are possible in which wireless communication between a component of the vehicle and an external communication partner takes place. They include applications in which a device separated or separable from the vehicle, for example, a cell phone or a portable computer, etc., is connected to the vehicle and wireless data exchange takes place via a transceiver device of the vehicle to a transceiver station. The communication partner may be a software application, for example, which runs on a computer which is connected to the transceiver station via a network. There may be, however, other devices or individuals that exchange data with a component of the vehicle via an electronic device which is connected to the transceiver station with the help of the network.

The wireless communication link between the transceiver device of the vehicle and the external transceiver station is normally designed as a WLAN (Wireless Local Area Network). In wireless communication links there is the basic difficulty that this link may be eavesdropped on by unauthorized persons. In particular when sensitive data are exchanged, eavesdropping and/or manipulation by an unauthorized person are to be avoided. For this purpose, different authentication and encryption mechanisms are used.

In the following it is assumed that the wireless communication link is a WLAN link. However, the description applies to any type of wireless communication link. WLAN networks allow mobile transceiver devices to establish a communication link to the external transceiver station which is referred to as an access point or a hotspot. WLAN access points may be made available from different operators. For example, contract dealers and contract workshops of an automobile manufacturer may make access points available to make communication with the vehicle via a WLAN link possible to thereby in turn facilitate service and troubleshooting. The owner of a vehicle may also operate a private WLAN via which he may transfer navigation data, multimedia data, etc., from his computer into a navigation unit of the vehicle or an infotainment unit of the vehicle. Further functionalities may be made available via WLAN links. For example, it is possible that access points are made available at gas stations and other public places via which additional services may be utilized.

The protection mechanisms that are used at the different access points are usually different. While a private WLAN network may be very well protected by the user because it is provided only for the communication with the vehicle and occasionally a few other electronic components, a publicly accessible access point, for example, a gas station or a fast-food restaurant, must allow access for a plurality of different devices and communication partners. There are access points that require both authentication and encryption of the data traffic. Other access points use neither authentication nor data encryption. In addition to data encryption, the trustworthiness of the access point affects the security of the communication. A public access point, for example, could be set up by a hacker. The trustworthiness may be checked via exchange of certificates. The trustworthiness of the access point, like data encryption, also contributes to the transmission security in wireless transmission.

In addition to transmission security between the mobile transceiver device and the transceiver station of the access point, the trustworthiness of the communication partner, as well as transmission from the external communication partner to the access point of the wireless communication link via a network, are relevant to the security of communication. Authentication of the external communication partner and encryption of the transmitted data may also be performed at this level.

All in all, there are thus very different communication scenarios as a function of the transmission security of the wireless communication link as well as of authentication of the external interlocutor or of the encryption of data in the case of a network transmission to the transceiver station of the wireless communication link. To allow a high degree of functionality, it is, however, necessary that individual components of the vehicle communicate with untrustworthy external communication partners or via wireless communication links that are not properly secured. In such a case, intrusion by a hacker into the communication link cannot be ruled out. The individual components of the vehicle are designed such that they should withstand an attack by a hacker. However, it has been found that, in particular in the case of software implementation, errors of this type allowing a hacker to gain control over the application, i.e., the particular component, are unavoidable. If a hacker has gained control over a component, he may attack other components of the vehicle via this component. If the computer of the vehicle communicates with a hacker, the hacker could attempt to find security holes in components or applications executed on the computer. As soon as a hacker finds a security hole in any application or component, he may make use of this security hole to gain control over this particular application or component. The hacker could use this infected application or component to gain access to the vehicle computer resources, interfaces, and other networked computer-supported or computer-based vehicle components which are connected to the vehicle computer. The hacked vehicle application may be used as a stepping stone for infecting other applications/components on the vehicle computer to ultimately gain access to the vehicle computer resources.

Thus, if only one of the many applications/components on the vehicle computer has a security hole which is found by a hacker, the hacker may use this infected application for gaining access to other applications/devices, resources, or components within the vehicle computer or such components that are linked to the vehicle computer on which the infected application is executed.

Unfortunately, vehicle manufacturers are unable to ensure that applications or components will not have any security holes. Security holes may always be found, and they have been found to be an unavoidable phenomenon of software development.

It must therefore be assumed that a vehicle computer equipped with a WLAN client within a vehicle has at least one executed application/component which has at least one security hole, and that this vehicle computer is allowed to communicate with a public access point (for example, a WLAN access point at a parking place, a gas station, or a fast-food restaurant, etc.).

It must furthermore be assumed that it is possible that the access point has already also been infected by a hacker or it is made available by the hacker. In such a case the infected access point would have the opportunity to test the executed applications/components on the vehicle computer to find security holes which may be made use of by the hacker.

SUMMARY

Example embodiments of the present invention provide a method and a device, as well as a communication system allowing more secure communication, between a component of a vehicle and an external communication partner via a wireless communication link.

Example embodiments of the present invention provide that at least one of multiple components of the vehicle exchanges data packets with an external communication partner via a wireless communication link. Data packets are understood not only as packets of a broken-up data stream, but also as a continuous data stream. A communication status is ascertained for the wireless communication link. On the basis of the communication status, a decision is made as to whether the at least one component and/or the external communication partner may access one or the other of the multiple components or whether it may exchange data with these other components. This means that a decision is made on the basis of the communication status of whether such a data exchange is enabled or disabled. In particular, a method is provided for secure communication of at least one of multiple components of a vehicle with at least one external communication partner via a wireless communication link, the multiple components in each case including at least one communication module for data exchange, including an exchange of data packets between a transceiver device of the vehicle and an external transceiver station, a communication status of the wireless communication link being ascertained and data exchange between the at least one component and/or the external communication partner on the one hand and others of multiple components on the other hand and/or access of the at least one component and/or the external communication partner to the others of the multiple components is enabled or disabled as a function of the communication status.

Furthermore, a device is provided for secure communication of at least one of multiple components of a vehicle with at least one external communication partner via a wireless communication link, the multiple components in each case including at least one communication module for data exchange, including an exchange of data packets between a transceiver device of the vehicle and an external transceiver station, a communication status of the wireless communication link being ascertainable and data exchange between the at least one component and/or the external communication partner on the one hand and others of the multiple components on the other hand and/or access of the at least one component and/or the external communication partner to the others of the multiple components may be enabled or disabled as a function of the communication status.

In ascertaining the communication status, all facts affecting or determining the communication link technically and regarding communication security may be taken into account.

Example embodiments of the present invention provide that in a communication status which indicates that possible security concerns exist, a hacker is denied access to certain sensitive components of the vehicle. The risk of a hacker intruding into a vehicle is thus substantially reduced.

The communication status may be ascertained on the basis of an encryption and/or authentication used by an external transceiver station. This ensures that the security problems that exist in particular due to the wireless transmission are taken into account in ascertaining the communication status.

Improved determination of the communication status is possible when alternatively or additionally the communication status is ascertained on the basis of an encryption and/or authentication used by the external communication partner.

In order to disable the data exchange between the at least one component and/or the external communication partner on the one hand and the others of the multiple components on the other hand and/or to disable access of the at least one component and/or the external communication partner to the others of the multiple components, at least the communication modules of the others of the multiple components may be deactivated. Communication modules may be parts of a component which are provided for data exchange via the vehicle computer of the vehicle. Access to another component may be access to the executable code of the component or the driver interfaces of the component or other data in the vehicle computer of the vehicle associated with this component. In individual cases the entire component may also be deactivated. For example, it makes no sense for a diagnosis component in the vehicle to be active if a communication link, for example, of a multimedia application, has been established to a public music archive via a public, unprotected WLAN access point. Such a diagnosis component which makes intervention in the vehicle controller elements possible should reasonably be activated only in a communication status in which not only is the wireless communication link secure but also communication with a trustworthy external communication partner is ensured.

The external transceiver station may include a WLAN access point. The transceiver device of the vehicle may be designed as a WLAN client.

The multiple components may include computer applications which are executed on a vehicle computer of the vehicle.

A communication link may be secured on different network/application layers or levels. The Open Systems Interconnection Reference Model, hereinafter referred to as the OSI model, describes these different levels or layers. The individual levels of the OSI model are referred to as OSI layers. In certain conventional methods and devices, authentication is carried out in different OSI layers. Thus, in WLAN networks, both authentication and encryption methods are conventional in OSI layers 2 and 3. However, it is also possible that authentication and/or encryption takes place in OSI layers 3 or 4 or even in multiple OSI layers, including OSI layers 5 through 7, which are referred to as application layers. For determining the communication status which should provide information about the security of the communication link and the trustworthiness of the communication partner, it is disadvantageous if the individual security protocols are implemented in different components and/or applications in different OSI layers. The authentication and/or encryption may be carried out in all network/application layers, in particular OSI layers, by a central security component of the vehicle. The security component implements all necessary authentication and encryption mechanisms in the different OSI layers. This offers the advantage that a security status and thus the communication status may be ascertained more easily. Another advantage is that a single security component is easier to service than multiple security components working in parallel and performing authentication/encryption in one or more of the network/application layers (OSI layers). The replication of different security protocols in different OSI layers is thus reduced. Errors within the security component, i.e., within the authentication and encryption components, are thus reduced overall.

The security component may ascertain the communication status.

The external communication partner may be an application program, for example, on an external computer which communicates with the transceiver station via a network. Application programs may provide the user with a high degree of functionality in the vehicle without the vehicle computer having to be capable itself of executing the application program. Thus, applications requiring considerable computing resources or a large database, i.e., a large memory, may be used from the vehicle.

The communication status may include a communication security level, and a component security level may be assigned to the individual components of the multiple components, and the data exchange with and/or access to the others of the multiple components may be disabled if the component security level of the corresponding others of the multiple components is lower than the ascertained communication security level. Thus, various scenarios may be classified into communication security levels. It may be established for each communication security level which one of the components may be active. A component security level may thus be assigned to each communication security level. Easy management of the access rights, i.e., the possibilities of deactivation or activation of the individual components, is thus ensured.

The features of the refinements of the device according to example embodiments of the present invention and of the communication system have the same and/or similar advantages as the corresponding features of the method.

Example embodiments of the present invention are described in more detail below with reference to the appended Figures.

DETAILED DESCRIPTION

Figure 1:
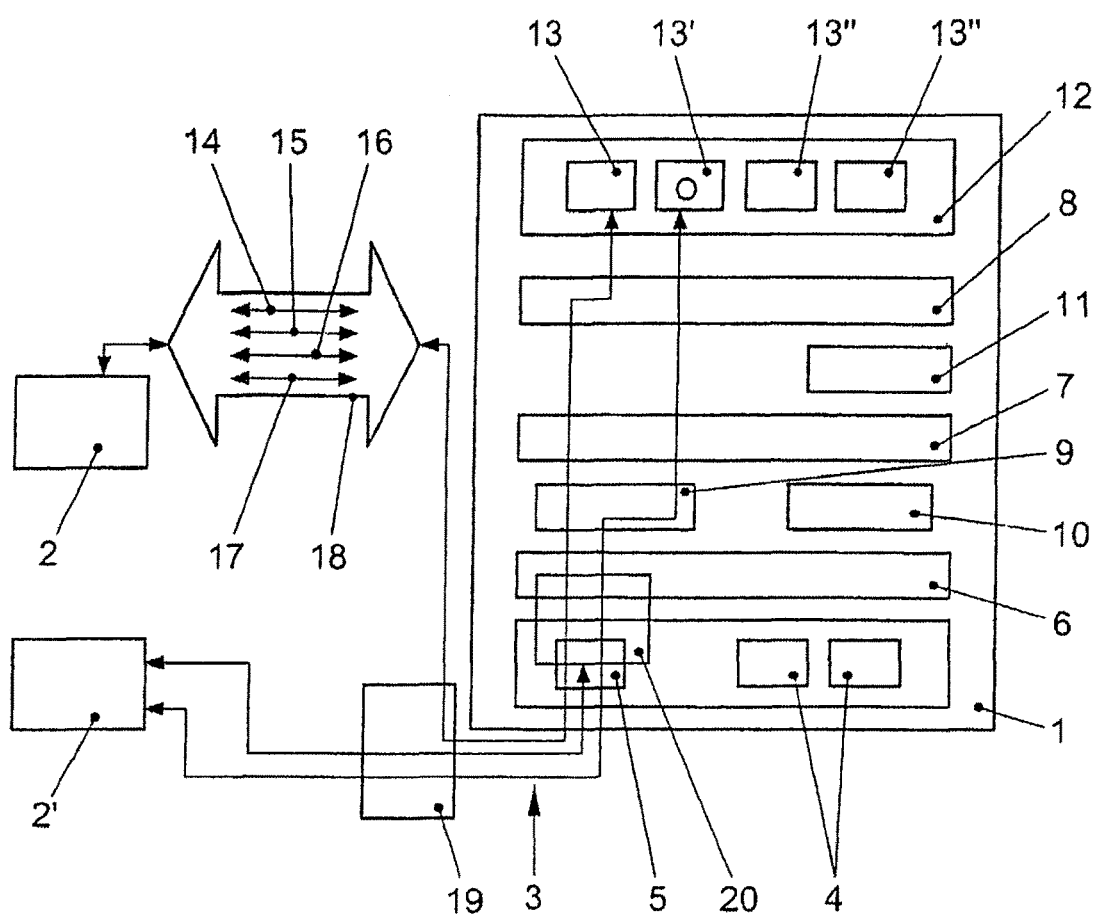
FIG. 1 is a schematic view of a vehicle computer integrated in a vehicle, which is able to communicate with external communication partners.

FIG. 1 schematically shows a vehicle computer 1 which is able to exchange data packets with external communication partners 2, 2' via a wireless communication link 3. Vehicle computer 1 includes bus systems 4, which are designed as CAN bus systems, for example. Furthermore, vehicle computer 1 includes a transceiver device designed as a WLAN client 5. Bus systems 4 and WLAN client 5 are connected to a virtual machine 8, which may be designed as a Java Virtual Machine, via an operating system network layer 6 (for example, Linux Network Layer) and an operating system socket layer 7 (for example, Linux Socket Layer). Operating system network layer 6 and operating system socket layer 7 are provided by the operating system (for example, Linux). There are different protocol families situated between operating system network layer 6 and operating system socket layer 7. These include internet protocol family 9 and, for example, a CAN bus family 10. A vehicle application programming interface 11 (vehicle API) via which standardized access to bus systems 4 is enabled may be provided between operating system socket layer 7 and virtual machine 8. An Open Service Gateway Initiative Platform (OSGi platform) 12, in which multiple vehicle applications 13, 13', 13" are executable, is provided on virtual machine 8. The vehicle applications may be components as described herein. Vehicle applications 13, 13', 13" may, however, also be parts of a vehicle component which includes additional hardware or software parts connected to vehicle computer 1 via one of bus systems 4. Vehicle applications 13, 13', 13" each include at least one communication module with whose aid they may exchange data with others of the multiple vehicle applications 13, 13', 13" or with one of the external communication partners 2.

Secure communication of a vehicle component with an external communication partner 2 may provide for four mechanisms. These four mechanisms are indicated by four double arrows 14, 15, 16, 17 within a large double arrow 18, which represents a secure communication via a wireless communication link. The four mechanisms include mutual authentication 14, an exchange of a session key 15, the exchange exclusively of signed or encrypted data 16, and the authentication of the origin of each received data packet 17. However, there will also be applications for the vehicle user in which he will want to connect with an external communication partner 2', who is not implementing any security measures. This is the case, for example, with providers that provide information free of charge within a broadcast. In this case, a communication link, including a wireless communication link 3 between WLAN client 5 and a transceiver station designed as WLAN access point 19, is established between external communication partner 2' and the component designed as vehicle application 13'. Access of external communication partner 2' to other components of vehicle 1 may be prevented with the aid of a firewall 20, which is also used as a port filter. However, if vehicle application 13' has a security hole, it may be infected, which is indicated by the letter "O." The infection may take place via communication partner 2 or via access point 19 or wireless communication link 3, depending on which of these are infected or "hacked."

Figure 2:
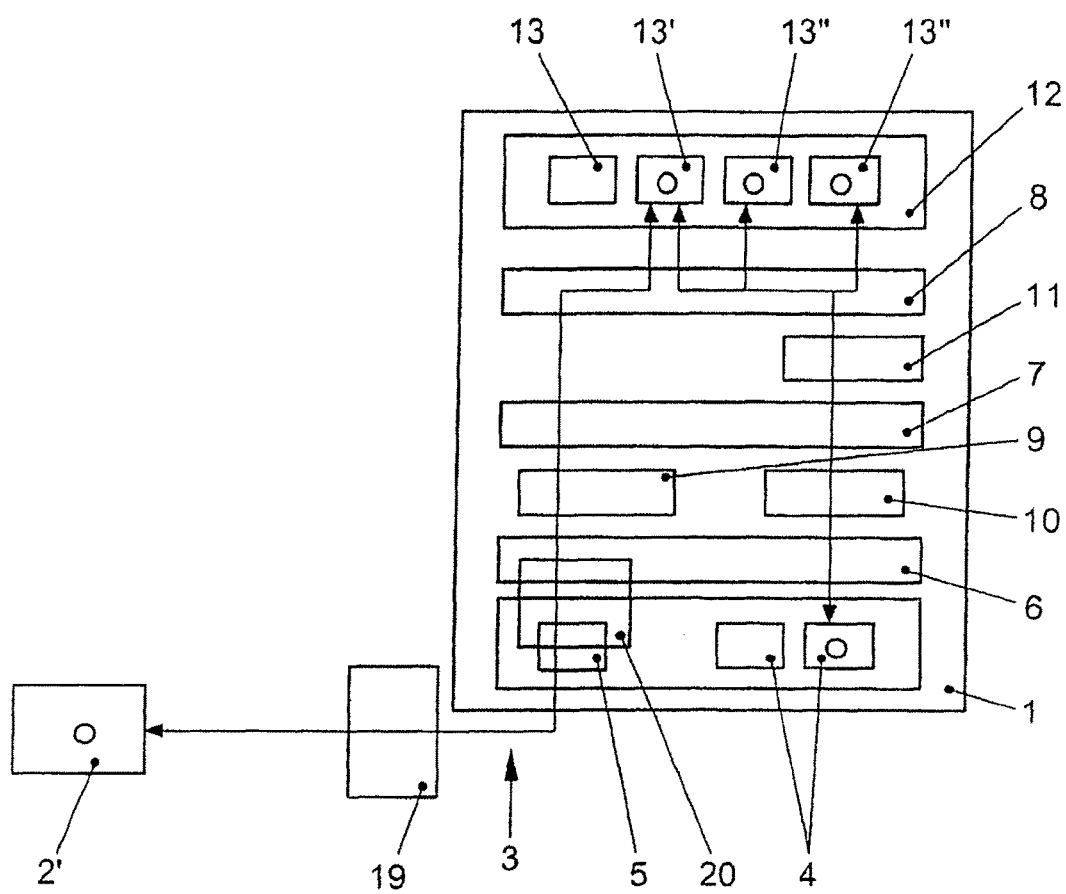
FIG. 2 is a schematic view of a vehicle computer in which a component has been infected by a hacker.

As FIG. 2 shows, this infected component which includes vehicle application 13' may be used to gain unauthorized access to other vehicle components which include vehicle applications 13". Vehicle applications 13" may be designed, for example, as communication modules of the components whose hardware parts are connected to vehicle computer 1 via one of bus systems 4. Infection of such a component is represented by an "O" in one of bus systems 4. Technically identical features are labeled with the same reference numerals in all figures. To prevent unauthorized access, a communication status for the communication link between the vehicle component and external communication partner 2 is ascertained. The communication status is used for making infection of components difficult or even impossible.

Figure 3:
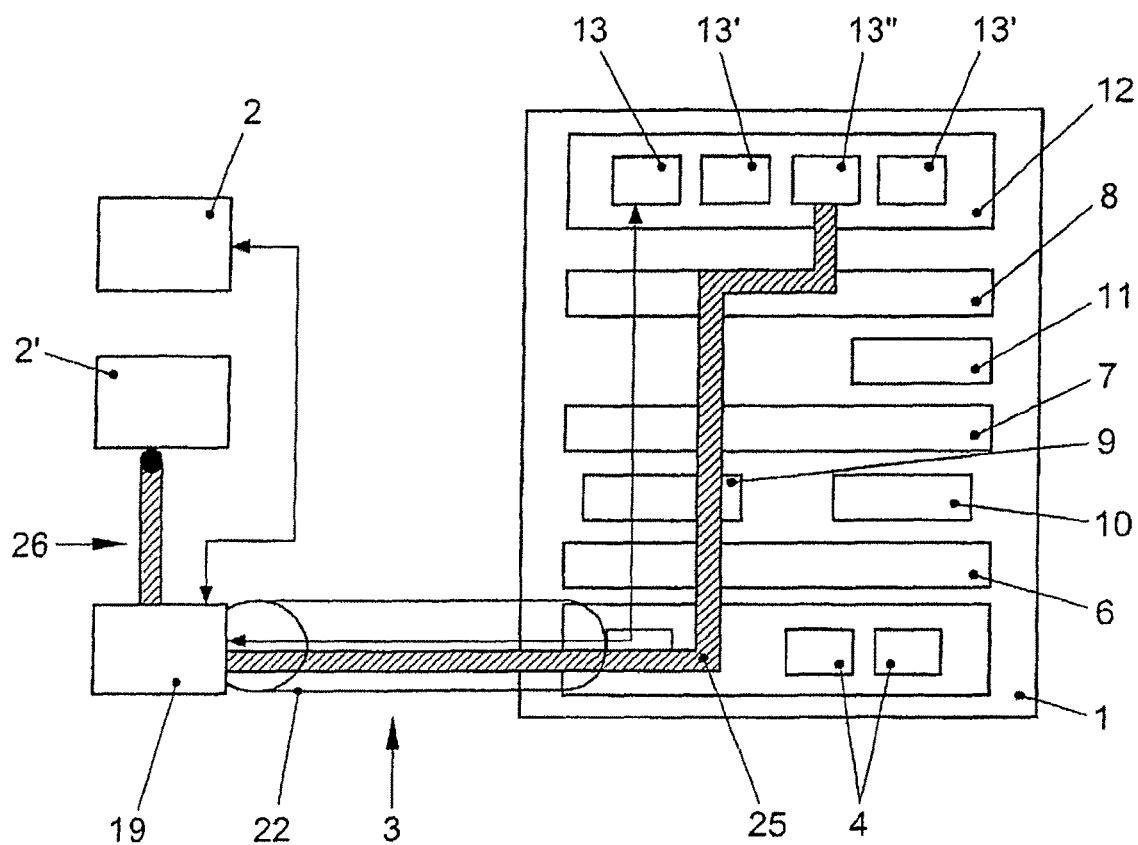
FIG. 3 is a schematic view of a vehicle computer and the different authentication and encryption methods.

FIG. 3 schematically shows vehicle computer 1 of a vehicle as in FIG. 1 and the different encryption and authentication options. Either authentication or encryption may be used between WLAN client 5 of the vehicle and WLAN access point 19 as illustrated with the aid of a tube-shaped tunnel 22. The data exchanged between external communication partner 2 and vehicle application 13 via wireless communication link 3 are transmitted in encrypted form between WLAN client 5 and WLAN access point 19. The trustworthiness of WLAN access point 19 and the form of the selected encryption therefore affect the communication status. Alternatively or additionally to the encryption in the OSI layer (OSI layer 2) between WLAN access point 19 and WLAN client 5, the data packets may be exchanged between external communication partner 2' and a vehicle component which includes vehicle application 13" encrypted as indicated by hatched communication link 25. In addition, both external communication partner 2' and the origin of the received data packets may also be authenticated. A link between another external communication partner 2' and vehicle application 13" is established in that the data packets are first encrypted before transmission and then decrypted again at the receiver. External communication partner 2' may be an application program which runs on a computer which is connected to WLAN access point 19 via network 26.

Different security scenarios may be identified on the basis of the different authentication and encryption mechanisms used. An exemplary classification of such scenarios is to be described below. The trustworthiness of the external interlocutor, the trustworthiness of the external transceiver station via which the wireless communication link is established, and the protection of the wireless communication link, for example, via encryption, are taken into account. Classification is initially performed into classes on the basis of the trustworthiness of the external communication partner. The vehicle manufacturer has the highest degree of trustworthiness, for example. It is classified into category A. A category B is assigned to trusted third parties, for example, those who are certified. Untrustworthy communication partners are grouped into a third category C. A security attribute, which is affected by the trustworthiness of the external transceiver station of the wireless communication link and the security of the wireless communication link, is additionally assigned to each category. The attribute "secure" is assigned when communication takes place in encrypted form via a trustworthy access point. The attribute "limited security" is assigned when communication takes place via an access point having limited trustworthiness, for example, via a secure WLAN access of a customer. The attribute "not secure" is assigned to the remaining situations in which access takes place via an untrustworthy access point. If the external communication partner is assigned to category C, the attribute "secure" is not assigned even if access takes place via a trustworthy and secure access point. In this manner, a total of eight security levels result in the classification system described, a communication scenario being presented for each:

Category A—secure: for communication between the manufacturer and a vehicle component via a trustworthy WLAN network, Category A—limited security: for communication with the vehicle manufacturer via a WLAN network having limited trustworthiness (secure WLAN connection of a vehicle owner), Category A—not secure: for communication with the vehicle manufacturer via an untrustworthy WLAN network (public parking place/gas station), Category B—secure: for communication with a trustworthy third party (for example, a licensed software provider) via a trustworthy WLAN network, Category B—limited security: for communication between a trustworthy third party and a vehicle component via a WLAN network of limited trustworthiness, Category B—not secure: for communication with a trustworthy third party via an untrustworthy WLAN network, Category C—limited security: for communication with an untrustworthy third party (information provider that has no relationship with the vehicle manufacturer and is unlicensed) via a trustworthy WLAN network or via a WLAN network of limited trustworthiness.

Category C—not secure: for communication with an untrustworthy third party via an untrustworthy WLAN network.

Figure 4:
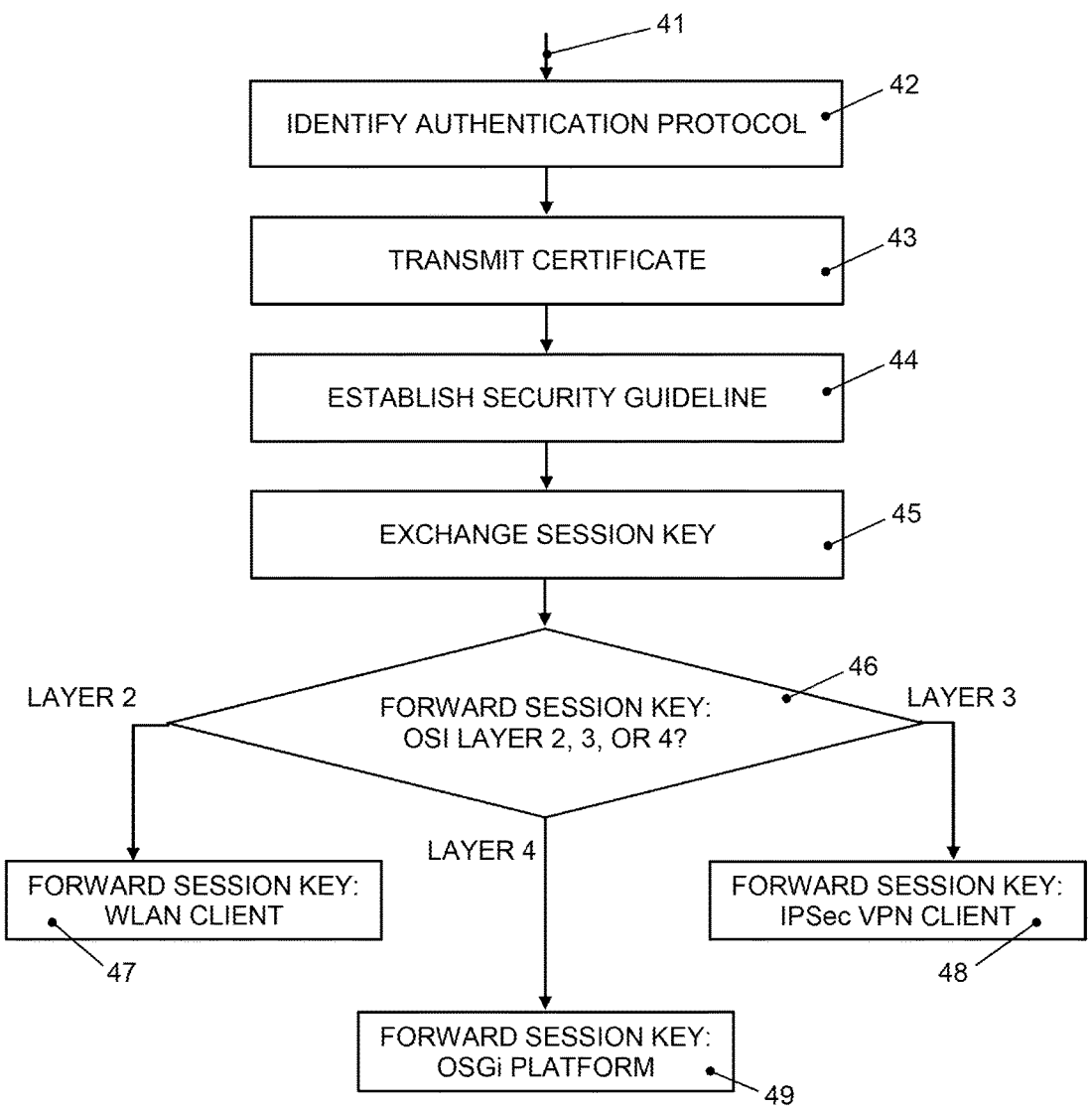
FIG. 4 is a schematic view of a security component.

These security levels are ascertained by a central security component which develops the authentication and/or encryption in all different OSI layers. The security component may be designed as software, but may also be entirely or partly designed as hardware. The mode of operation is described with reference to FIG. 4. The security component initially receives an authentication request 41. The authentication protocol is then identified as 42. This may vary as a function of the OSI layer from which the authentication request originates. In OSI layer 2 these are, for example, the WPAP (Wireless Protected Access Protocol) or the EAP-TLS (Extensible Authentication Protocol—Transport Layers Security). In OSI layer 3 this is, for example, the IPSec VPN (Internet Protocol Security Virtual Private Network) protocol. In OSI layer 4, this is, for example, the SSL (Secure Socket Layer) protocol. A certificate is received which determines the class and identification of the access point and the receiving party's own certificate is transmitted as 43. A security guideline is then established as 44 according to the identification and class of the access point. The security guideline establishes the access of the component to which a link has been established and of the external communication partner to other components. Subsequently a session key is exchanged with access point 45. Depending on which protocol has been used, a decision 46 is made about where the session key will be forwarded. If a protocol of OSI layer 2 is used, the session key is delivered to the WLAN client or a WLAN card 47. If it is a protocol of OSI layer 3, the session key is delivered to an IPSec VPN client, for example 48. If the authentication protocol is from layer 4, the session key is forwarded for example to the OSGi platform 49. The different security protocols then perform the authentication and/or encryption. They are all performed or at least checked and controlled by the security component. The security component may additionally ascertain the trustworthiness of the external communication partner to thus establish a communication status, in particular a security level. The trustworthiness of the communication partner is ascertained, for example, via an exchange of certificates.

Figure 5:
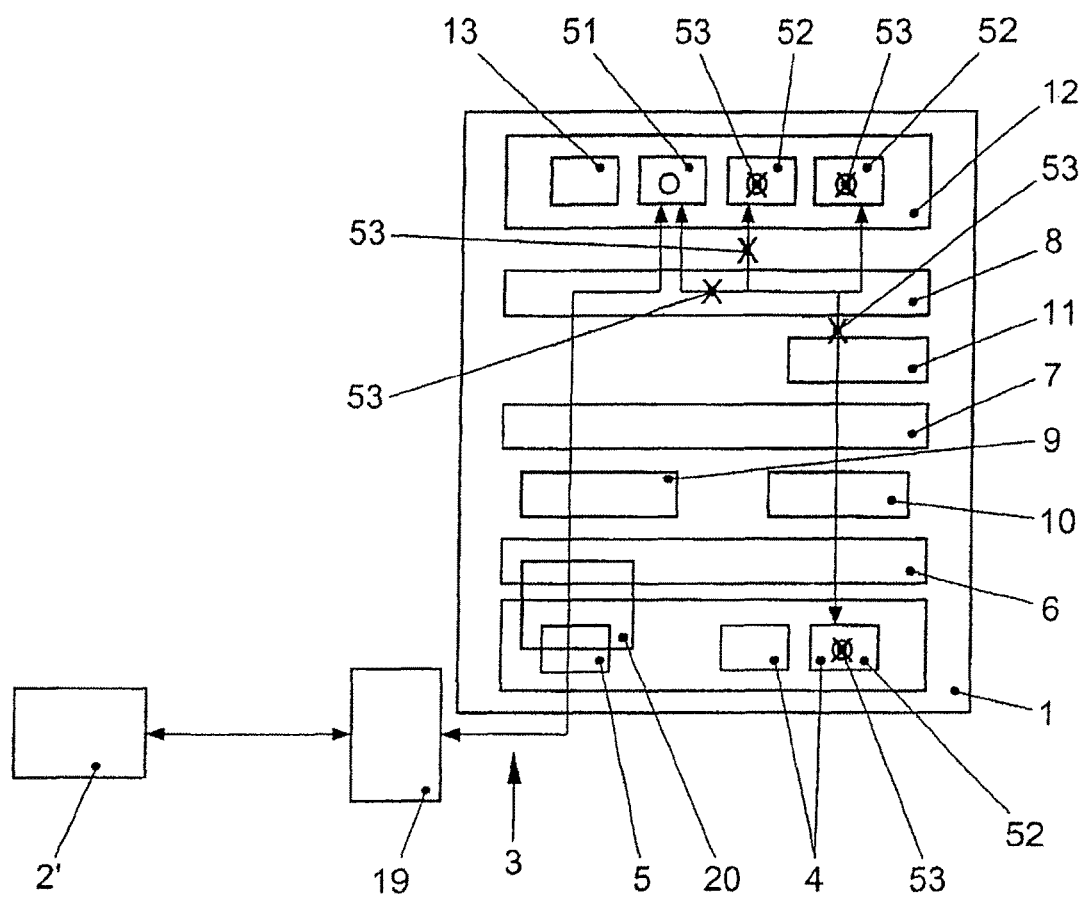
FIG. 5 is a schematic view of a vehicle computer in which access to other components is disabled because of the ascertained communication status.

A component security level is assigned to each of the individual components, which may be vehicle applications on the vehicle computer. FIG. 5 shows how the data exchange of at least one component 51 to other components 52 is disabled. This is indicated by crosses 53. Component 51 is allowed, even at a lower security level of the communication link, to communicate with an external communication partner 2'. Since in this case there is the risk that the at least one component 51 becomes infected if, for example, wireless communication link 3 is manipulated by a hacker, the other components 52 or at least their communication modules are deactivated. External communication partner 2' and/or the at least one component 51 of vehicle 1 are thus prevented from exchanging data with other components 52 or accessing the same. An infection of these other components 52 or unauthorized access to these other components 52 is thus reliably prevented. All in all, a particularly advantageous communication system thus be provided.

What is claimed is:

1. A method for secure communication of at least one of multiple components of a vehicle with at least one external communication partner, wherein the secure communication is via a wireless communication link and each of the multiple components includes at least one communication module for data exchange, comprising:
    exchanging data packets between a transceiver device of the vehicle and an external transceiver station;
    ascertaining a communication status of the wireless communication link, wherein the communication status includes a level of security of the communication;
    assigning a security level to individual components of the multiple components; and
    as a function of the ascertained communication status of the wireless communication link, and the security level assigned to the individual components of the multiple components, at least one of:
    (a) enabling at least one of:
    (i) data exchange between the at least one of the multiple components and others of the multiple components,
    (ii) data exchange between the external communication partner and the others of the multiple components,
    (iii) access of the at least one of the multiple components to the others of the multiple components, and
    (iv) access of the external communication partner to the others of the multiple components; and
    (b) disabling at least one of:
    (i) data exchange between the at least one of the multiple components and the others of the multiple components,
    (ii) data exchange between the external communication partner and the others of the multiple components,
    (iii) access of the at least one of the multiple components to the others of the multiple components, and
    (iv) access of the external communication partner to the others of the multiple components.

2. The method according to claim 1, wherein the communication status is ascertained in the ascertaining step based on at least one of (a) an encryption and (b) an authentication used by the external transceiver station, wherein at least one of (a) and (b) is used for establishing the wireless communication link.

3. The method according to claim 1, wherein the communication status is ascertained in the ascertaining step based on at least one of (a) an encryption and (b) an authentication used by the external communication partner.

4. The method according to claim 1, wherein the disabling includes deactivating at least the communication modules of the others of the multiple components.

5. The method according to claim 1, wherein the external transceiver station includes a WLAN access point.

6. The method according to claim 1, wherein the transceiver device of the vehicle includes a WLAN client.

7. The method according to claim 1, wherein the multiple components include computer applications configured to be executed on a vehicle computer of the vehicle.

8. The method according to claim 1, further comprising performing at least one of (a) an authentication and (b) an encryption in all network/application layers by a central security component of the vehicle.

9. The method according to claim 1, further comprising performing at least one of (a) an authentication and (b) an encryption in OSI layers by a central security component of the vehicle.

10. The method according to claim 8, wherein the security component includes computer application executable on a vehicle computer.

11. The method according to claim 8, wherein the communication status is ascertained in the ascertaining step by the security component.

12. The method according to claim 1, wherein the external communication partner includes an application program on an external computer which communicates with the transceiver station via a network.

13. The method according to claim 1, wherein the communication status includes a communication security level, the method further comprising assigning a component security level to each of the multiple components, the disabling including disabling at least one of (a) data exchange with and (b) access to the others of the multiple components if the component security level of the corresponding others of the multiple components is lower than the communication security level.

14. The method according to claim 1, wherein the communication status based on the security of the communication is ascertained based on at least one of (a) transmission security between the transceiver device of the vehicle and the external transceiver station, (b) trustworthiness of the external communication partner, and (c) encryption of the exchanged data between the external communication partner and the at least one of the multiple components.

15. A device for secure communication of at least one of multiple components of a vehicle with at least one external communication partner, wherein the secure communication is via a wireless communication link and each of the multiple components includes at least one communication module configured for data exchange, comprising:
    a transceiver device of the vehicle configured to exchange data packets with an external transceiver station;

an arrangement configured to ascertain a communication status of the wireless communication link, wherein the communication status includes a level of security of the communication;

an arrangement configured to assign a security level to individual components of the multiple components; and an arrangement configured to, as a function of the ascertained communication status of the wireless communication link, and the security level assigned to the individual components of the multiple components, at least one of:

(a) enable at least one of:

(i) data exchange between the at least one of the multiple components and others of the multiple components, (ii) data exchange between the external communication partner and the others of the multiple components, (iii) access of the at least one of the multiple components to the others of the multiple components, and (iv) access of the external communication partner to the others of the multiple components; and (b) disable at least one of:

(i) data exchange between the at least one of the multiple components and the others of the multiple components, (ii) data exchange between the external communication partner and the others of the multiple components, (iii) access of the at least one of the multiple components to the others of the multiple components, and (iv) access of the external communication partner to the others of the multiple components.

16. The device according to claim 15, wherein the communication status is ascertainable based on at least one of (a) an encryption and (b) an authentication used by the external transceiver station, wherein at least one of (a) and (b) is used for establishing the wireless communication link.

17. The device according to claim 15, wherein the communication status is ascertainable based on at least one of (a) an encryption and (b) an authentication used by the external communication partner.

18. The device according to claim 15, further comprising an arrangement configured to deactivate the communication modules of the others of the multiple components to disable the at least one of (a) data exchange and (b) access.

19. The device according to claim 15, wherein the external transceiver station includes a WLAN access point.

20. The device according to claim 15, wherein the transceiver device of the vehicle includes a WLAN client.

21. The device according to claim 15, wherein the vehicle includes a vehicle computer, and the multiple components include computer applications executable on the vehicle computer of the vehicle.

22. The device according to claim 15, further comprising a central security component of the vehicle configured to perform at least one of (a) authentication and (b) encryption in all network/application layers by a central security component of the vehicle.

23. The device according to claim 15, further comprising a central security component of the vehicle configured to perform at least one of (a) authentication and (b) encryption in OSI layers by a central security component of the vehicle.

24. The device according to claim 22, wherein the security component includes a computer application executable on a vehicle computer.

25. The device according to claim 15, wherein the communication status is ascertainable by a security component.

26. The device according to claim 15, wherein the external communication partner includes an application program executable on an external computer connected to the transceiver station via a network.

27. The device according to claim 15, wherein the communication status includes a communication security level, a component security level being assigned to individual components of the multiple components, and the at least one of (a) the data exchange with and (b) the access to the others of the multiple components disabled if the component security level is lower than the communication security level of corresponding others of the multiple components.

28. The device according to claim 15, wherein the communication status based on the security of the communication is ascertained based on at least one of (a) transmission security between the transceiver device of the vehicle and the external transceiver station, (b) trustworthiness of the external communication partner, and (c) encryption of the exchanged data between the external communication partner and the at least one of the multiple components.

29. A communication system for secure communication of at least one of multiple components of a vehicle with at least one external communication partner, wherein the secure communication is via a wireless communication link and each of the multiple components includes at least one communication module configured for data exchange, comprising:

an external transceiver station including a WLAN access point; and a device including:

a transceiver device of the vehicle configured to exchange data packets with the external transceiver station;

an arrangement configured to ascertain a communication status of the wireless communication link, wherein the communication status includes a level of security of the communication;

an arrangement configured to assign a security level to individual components of the multiple components; and an arrangement configured to, as a function of the ascertained communication status of the wireless communication link, and the security level assigned to the individual components of the multiple components, at least one of:

(a) enable at least one of:

NY01 4317874 7

(i) data exchange between the at least one of the multiple components and others of the multiple components, (ii) data exchange between the external communication partner and the others of the multiple components, (iii) access of the at least one of the multiple components to the others of the multiple components, (iv) access of the external communication partner to the others of the multiple components; and (b) disable at least one of:

(i) data exchange between the at least one of the multiple components and the others of the multiple components, (ii) data exchange between the external communication partner and the others of the multiple components, (iii) access of the at least one of the multiple components to the others of the multiple components, and (iv) access of the external communication partner to the others of the multiple components.

30. The system according to claim 29, wherein the communication status based on the security of the communication is ascertained based on at least one of (a) transmission security between the transceiver device of the vehicle and the external transceiver station, (b) trustworthiness of the external communication partner, and (c) encryption of the exchanged data between the external communication partner and the at least one of the multiple components.

* * * * *

UNITED STATES PATENT AND TRADEMARK OFFICE
CERTIFICATE OF CORRECTION

PATENT NO. : 9,591,480 B2  
APPLICATION NO. : 11/922425  
DATED : March 7, 2017  
INVENTOR(S) : Aijaz Page 1 of 1

It is certified that error appears in the above-identified patent and that said Letters Patent is hereby corrected as shown below:

In the Claims

In Column 12, Line 46, delete "NY01 4317874 7"

Signed and Sealed this  
Twenty-fifth Day of April, 2017

Michelle K. Lee  
*Director of the United States Patent and Trademark Office*